United States Patent
Chmounk et al.

(10) Patent No.: US 7,114,071 B1
(45) Date of Patent: Sep. 26, 2006

(54) METHOD AND APPARATUS FOR EMBEDDING DIGITAL WATERMARKING INTO COMPRESSED MULTIMEDIA SIGNALS

(75) Inventors: Dmitri V. Chmounk, Novosibirsk (RU); Richard J. Beaton, Burnaby (CA); Darrell P. Klotzbach, San Jose, CA (US); Paul R. Goldberg, Palo Alto, CA (US)

(73) Assignee: DTS Canada, ULC, (CA)

( * ) Notice: Subject to any disclaimer, the term of this patent is extended or adjusted under 35 U.S.C. 154(b) by 917 days.

(21) Appl. No.: 09/952,624

(22) Filed: Sep. 13, 2001

(51) Int. Cl.
*G06F 11/30* (2006.01)

(52) U.S. Cl. .................. 713/164; 713/165; 713/166; 713/200; 713/201

(58) Field of Classification Search .............. 713/164, 713/165, 166, 200, 201, 168, 189, 196, 194
See application file for complete search history.

(56) References Cited

U.S. PATENT DOCUMENTS 6,226,441 B1 * 5/2001 Hartung et al. ............... 386/46
6,315,200 B1 * 11/2001 Silverbrook et al. .......... 235/454
6,604,072 B1 * 8/2003 Pitman et al. ................ 704/231
2002/0009000 A1 * 1/2002 Goldberg et al. ............ 365/200

FOREIGN PATENT DOCUMENTS

WO    WO 00/59148    10/2000

OTHER PUBLICATIONS

Craver et al., "Reading Between the Lines: Lessons from the SDMI Challenge," Proceedings of the 10th USENIX Security Symposium, Aug. 13, 2001, pp. 353-363.

* cited by examiner

*Primary Examiner*—Thomas R. Peeso
(74) *Attorney, Agent, or Firm*—Blake A. Welcher; William L. Johnson; Parsons Hsue & De Runtz LLP

(57) ABSTRACT

A method and apparatus for adding watermark data to an input signal is provided. For this method watermark data is embedded into the input signal by modulating elements of the input signal to predefined relationships in reference to other elements of the input signal. By using referential relationships and by using patterned sequences, one or more bits of data can robustly be embedded. Further, a method and apparatus for recovering data embedded by the method and apparatus of the present invention, are also provided. To recover the embedded data, differences between elements of the input signal to reference elements of the signal are calculated and checked against predefined relationships. Predefined relationships thus found are used to recover pieces of the embedded information.

15 Claims, 4 Drawing Sheets

400

300

METHOD AND APPARATUS FOR EMBEDDING DIGITAL WATERMARKING INTO COMPRESSED MULTIMEDIA SIGNALS

TECHNICAL FIELD OF THE INVENTION

The present invention relates to systems used to embed data into compressed audio, video and other signals in a way that is not normally detectable during the subsequent use of the compressed signals. More particularly, the present invention provides methods of adding hidden data at various stages of compressed data creation, delivery and playback and subsequently detecting and displaying this hidden data. Such capabilities generally relate to systems for protecting ownership rights associated with audio, video and other signals, as well as providing additional information and functionality to end users that enhance the entertainment experience.

BACKGROUND OF THE INVENTION

The range of methods that embed hidden data into entertainment signals are usually referred to as watermarking, regardless if these signals are originally created and/or distributed in the analog or digital form. They can be used to protect ownership rights associated with the entertainment signals so marked. This hidden data can also be used to provide the consumer with ancillary data associated with entertainment (audio, video or multimedia program) material being reproduced. Hidden information added to audio, video and other multimedia signals are called watermarks. Watermarked signals are used in the same way as their non-watermarked counterparts. For example, watermarked audio signals are typically played with their watermarks in place, such watermarks going undetected by the listener or viewer unless their playback equipment is fitted with apparatus to detect and reproduce the watermark data. Watermarks can also be detected and retrieved by the providers of the content, allowing these entities to perform a range of tasks including determining the holder or holders of the signal's copyright, verifying the authenticity of the entertainment signal, and determining the signal's place of origin.

To be effective, watermarking methods must not have a perceptible impact on signal quality. The level where perceptibility becomes problematic depends on the type of signal and its intended use. As a result, different watermarking methods may be appropriate for different signals and uses. Watermarking should also be tamper resistant. This means that watermarks must be difficult, if not impossible, to remove.

Most current watermarking systems embed information within signal portions that would be characterized (from the standpoint of perceptibility) as noise. This reduces the chance that embedded information will alter signals in a perceptible fashion. At the same time, such methods are often subject to tampering because it is generally possible to replace the noise-like portions of a signal with generated noise. This replacement effectively removes hidden watermark data with little or no degradation to signal quality. Based on the preceding, it may be appreciated that there is a need for improved tamper-resistant methods for watermarking entertainment signals.

Watermark data has been traditionally inserted at the time audio and/or video content is mastered. A watermark of this type is referred to as a source watermark. This watermark serves the content owners need to be able to track the original origin of the entertainment content. There is a second need to add hidden tracking, ancillary entertainment, and/or advertising data during the process of distributing the audio and video content to end users. A watermark of this type is referred to as a transaction watermark. This watermark identifies the distributor of the content and adds additional data to the content that is of use to the end user. There is a third need to add hidden data at the time of audio and video content playback by the end user. A watermark of this type is referred to as a fingerprint watermark. This hidden data relates to the rules of use associated with the reproduced entertainment stream as well as identification of the end user who played back the audio and/or video data. These rules of use may include the number of times this data stream can be subsequently copied as well as who has permission to perform such copying. The identification of the end user in the data streams can serve two purposes. One is to track a distributed data stream to determine if an end user violated the copyright holders rights. A second is to provide a means to reward the end user should he or she provide the data stream to a third party and the third party chooses to purchase an entertainment product from the content owner or distributor of the content.

SUMMARY OF THE INVENTION

The present invention, generally, relates to a technique for adding watermark data to an input signal, such as during the process of compressing this input signal for delivery. The input signal is in either digital or analog form and can include audio, video or other multimedia content. The watermarking method creates a watermarked signal as an output that is either in compressed digital form, uncompressed digital form or analog form. The watermarked output signal is intended to be useable in place of the original input signal.

Thus, the present invention provides a technique for both embedding into, and recovering embedded data from, a signal. The method of embedding is by modulation of selected portions of the signal, hereafter referred to as elements, in reference to other elements of the signal. Examples of elements include, but are not limited to: the amplitude or power of an individual spectral component, the power of a group of two or more spectral components, and the overall amplitude of a series of time samples in time. In one embodiment of the invention, the element modulated is the power of a group of spectral components; said power being calculated by summing the power of each individual spectral component comprising the group. Hereafter, the term 'reference element' is used to refer to a chosen element from which one or more embeddee elements are modulated by a predefined relationship to said chosen element. As used herein, an 'embeddee element' is used to refer to the element modulated by a predefined relationship to the reference element, so as to embed a portion of the information to be embedded. A referential change refers to changing an embeddee element so as to have the predefined relationship to its reference element.

In an implementation of the invention, the input signal is digitized and divided into a series of frames, each composed of a predetermined number of time domain samples. These time domain samples are then converted to their frequency domain representation on a frame-by-frame basis. These signal frames are processed sequentially starting with the first frame and ending with a last frame. The frame currently being processed is referred to as the current frame. The frame just processed is referred to as the previous frame.

One or more bits of watermark data are embedded into the signal frames by changing the power level of elements within the frame to a predefined relationship to a reference element from a specified pattern of elements. In one simple implementation of the invention, the reference element is chosen to be the same element in the previous frame as the embeddee element in the current frame. In another implementation, the reference element is the same element as the embeddee element from a different frame from a specified pattern of frames. In yet another implementation, the reference element is a different element from the embeddee element within the same frame. In the simplest case, only one bit value is computed for all of the spectral components within a signal frame, making the spectral power level of the signal frame the embeddee element. The process of modulating embeddee elements is repeated until all of the watermarked data has been embedded. Following this watermark embedding process, the input signal can be compressed, although it is not necessary to do so. Since the embedded watermark data is carried in the difference between elements whose integrity is maintained throughout the compression process, even though the elements themselves have been modified to reduce the amount of data required for their representation, the embedded watermark data remains in the compressed bit stream and can be detected as described later.

Another aspect of the present invention includes a method for adding hidden data to compressed audio content at the time this audio content is played back by the end user. This process of data addition can take place immediately before the audio data is dequantized, while it is still in its compressed transform representation. It can also take place after the audio data is dequantized, but before it is converted from its dequantized transform representation into its time domain representation. Other implementations working in the time domain are also possible that would be in the spirit of this invention. In this aspect of the invention, frames of spectral components of the input signal, which have been modified by various means well know in the art in order to effect a compressed data representation of the input signal, have the power level of embeddee elements modulated. The modulation process embeds hidden data as referential differences between embeddee elements and reference elements. In this example, the power level of elements from a patterned series of elements are modified to a predefined relationship to reference elements such that ratio of the difference in power of the two elements to the embedding depth, is an even or odd value so as to embed one bit of information as either a binary 1 or a 0. Other ratios can be chosen so as to embed more, or different information. The patterned series of elements may use one or more reference elements to embed data.

The present invention also includes a method for extracting watermark data from an input signal. This method can be carried out on compressed representations of the input signal as well as on uncompressed versions of the input signal. In the case of uncompressed signals, in one embodiment of the invention, the signal is first transformed to the frequency domain and divided into frames. The division into frames can occur before the transform into the frequency domain. In the simplest case, the embeddee element is the spectral power of the entire frame. In this case, the combined spectral power of a current frame of a signal embedded with watermark data is compared to the spectral power of its reference frame, which in the simplest case is the previous frame. Only one comparison may be performed for all of the spectral components within the two signal frames. This comparison yields a single zero or one bit for this two frame pair. In another implementation of the invention, differences from more than one reference frame can be used. In more typical implementations, one or more frequency ranges are used as embeddee elements. In the examples described hereinafter, three frequency ranges are used, though other implementations may use more complex ranges such as those used for modeling the critical bands of hearing. In these implementations, the power of each embeddee element is compared to the power of the same element in the preceding frame from a patterned series of frames and each comparison yields a separate zero or one bit. Another implementation involves choosing one element within the frame to be the reference element, and other elements carry embedded information in reference to the reference element. Thus the data carrying capacity or the robustness of the embedded watermark data stream can be increased. The concept of employing multiple groups of spectral components per specified frame is especially important with regard to the ability to recover watermark data when the input signal characteristics are noisy or noise-like. With redundant watermark data placed in two or more elements, data can more reliably be recovered under a larger variety of signal conditions. The process of comparing power levels just described is repeated until the entire watermark is extracted.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 8 of the drawings. Like numerals are used for like and corresponding parts of the various drawings.

Embedding Method

Figure 1:
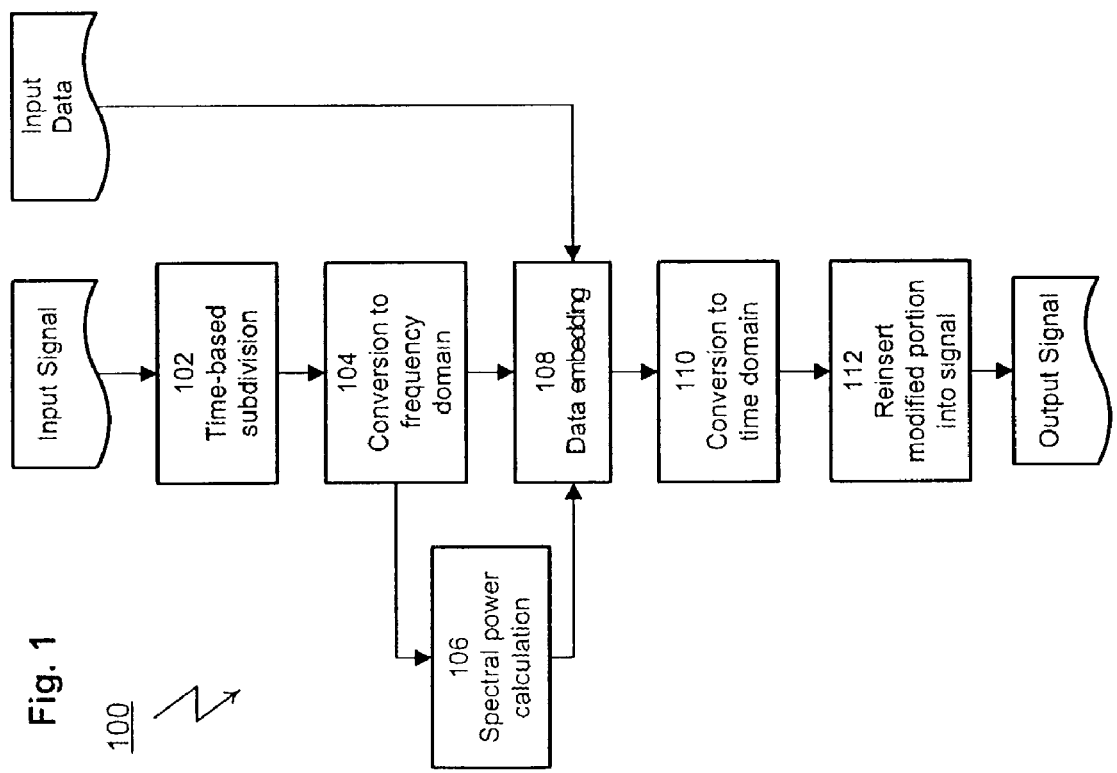
FIG. 1 is a flowchart showing the steps associated with a data embedding method as provided by the present invention.

One aspect of the present invention includes a method for embedding data within audio, video or other multimedia content. An implementation of the embedding method is designated 100 in FIG. 1. As shown in FIG. 1, embedding method 100 accepts an input signal along with a quantity of data to be embedded. The result of embedding method 100 is an output signal. The output signal includes the content of the input signal subtly modified to embed the data.

The output signal is intended to be usable in place of the original input signal. For this particular example, both the input and output signals are assumed to be in digital, time-domain form. This assumption is made largely to simplify the following description. It should be appreciated, however that embedding method 100 is specifically intended to be useful with signals of other formats (e.g., analog signals) with suitable modification and signal conversion.

In the following description, embedding method 100 is treated as a series of steps. It should be appreciated that this does not necessarily require that the steps be performed sequentially or in the order shown. It should also be appreciated that, at any given time, multiple steps within embedding method 100 may be active in a pipelined, overlapping fashion.

Embedding method 100 begins with steps 102 where the input signal is divided into a series of signal frames. Each frame includes a predetermined number of time-domain samples. Each signal frame produced by step 102 is passed to step 104. In step 104, the contents of each received signal frame are converted from time-domain samples to frequency-domain samples. In a typical implementation, this conversion is performed by first windowing each signal frame and then converting to frequency domain data using a Fast Fourier Transformation (FFT) or other suitable method.

The windowing operation reduces frame-to-frame discontinuities that might otherwise be created during conversion to the frequency domain. This decreases the tendency for the signal frequency spectrum to broaden during the conversion process. For this particular example, step 102 applies three Hann windowing functions having the following form:

$$W(x) = \frac{1 - \cos\left(\frac{2 \cdot \pi \cdot x}{L-1}\right)}{2}$$

The Hann windowing function is used to generate W, $W^2$ and $W^{3/2}$ window shapes. It should be appreciated that this particular combination of Hann windowing shapes is only one possible example. A wide range of other windowing functions may also be used.

Once windowed, each signal frame is converted to the frequency domain using a Discrete Transformation (DT) or other technique. Different DT's may be used. For this particular implementation, a Fast Fourier Transform (FFT) having 1024 points is used.

Each frequency-domain signal frame produced by step 104 is passed to both of steps 106 and 108. In step 106, one or more spectral power values, P, are computed for each received signal frame. For the particular example being described, respective power values $P_1$, $P_2$ and $P_{3/2}$ are computed for the W, $W^2$ and $W^{3/2}$ window shapes. Again, for the particular example being described, each power value, P, represents the power within a particular window shape of the signal frame. For this example, the power value of a window shape is defined to be the summation of the magnitudes of the spectral lines within that window shape. For other implementations, power values may be defined in other ways known in the art. In yet other implementations, other groupings of frequencies may be defined such as ones used to model the critical bands of hearing.

The computed spectral power values P are passed to step 108. Step 108 receives three inputs. These include each frequency-domain signal frame as it is produced by step 104 as well as the corresponding spectral power values P computed by step 106. The inputs to step 108 also include the data that is to be embedded.

In step 108, one or more data bits are embedded in each received frequency-domain signal frame. The embedding takes advantage of the fact that small changes in spectral power are difficult to perceive. This allows information to be embedded as reference element power differentials. In the simplest form, each signal frame embeds a single data bit. In this case, the power of the signal frame is the element used as the embeddee and reference elements. This bit is defined as a one or zero by modulating the power of a signal frame with respect to the reference frame. In one embodiment of the invention, the reference frame is the immediately preceding frame such that the difference between adjacent frames provides one bit of embedded information. Other frame patterns may be chosen. The bit can be later detected by determining the spectral power difference of the signal frame with respect to the reference frame.

To embed data in the current signal frame, a linear scaling coefficient ($S_{coef}$) is first calculated. The calculation of $S_{coef}$ for the current signal frame is based on the state of the data bit to be embedded. Two equations are used:

$$Adj = 2 \cdot \left[\frac{\text{Diff} - \text{Depth}}{2 \cdot \text{Depth}}\right] \cdot \text{Depth} + \text{Depth} - \text{Diff} \quad (1.1)$$

and:

$$Adj = 2 \cdot \left[\frac{\text{Diff}}{2 \cdot \text{Depth}}\right] \cdot \text{Depth} - \text{Diff} \quad (1.2)$$

One of equations 1.1 and 1.2 is used to represent bits having a zero value. The other is used to represent bits having a one value. It may be appreciated that the polarity between bit values and equations 1.1 and 1.2 is entirely arbitrary. The operator [ ] indicates rounding to the nearest integer.

Within equations 1.1 and 1.2, the quantity Diff is defined as:

$$\text{Diff} = mod(P_{cur} - P_{ref}, \text{Depth}) \quad (1.3)$$

where Depth is a constant referred to as the watermarking depth parameter and mod is a function which returns the remainder from dividing the first parameter of the function (in this case $P_{cur} - P_{ref}$) by the second parameter of the function (in this case Depth). The Depth constant controls the tradeoff between watermark audibility and robustness and is generally set to a value of between 0.1 db and 2.0 db. Depth is either fixed for a given implementation or can be transmitted as part of the output signal. The later may be the case when used as part of a compressed audio signal. $P_{cur}$ is defined as $P_{curr} = 10 \cdot \log(P_1)$. $P_{ref}$ is same calculation as $P_{curr}$ computed for the reference element (i.e., $P_{ref} = 10 \cdot \log(P_1)$ computed for the element used as the reference element).

The value of Adj, calculated using equation 1.1 or 1.2 is used to calculate a scaling coefficient S as follows:

$$S = 10^{\frac{Adj}{20}} \quad (1.4)$$

To account for the effects of the windowing functions applied in step 104, the value S is not used directly. Instead, S is used to calculate the value $S_{corr}$ as follows:

$$S_{corr} = 1 + \frac{\sqrt{P_{3/2}^2 - P_1 \cdot P_2 \cdot (1 - S^2)} - P_{3/2}}{P_2} \quad (1.5)$$

The spectral power of the current frame is then scaled by the value of $S_{corr}$.

Alternately, several different approximations may be used in place of equation 1.5. These include:

$$S_{corr} = 1 + \frac{(S^2 - 1) \cdot P_1}{P_{3/2}} \quad (1.6)$$

and, preferably:

$$S_{corr} = 1 + \frac{(S - 1) \cdot P_1}{P_2} \quad (1.7)$$

Compared to equation 1.5, equations 1.6 or 1.7 are both simpler and faster to solve. It should also be noted that each requires only two power values ($P_1$, $P_{3/2}$ for equation 1.6 and $P_1$, $P_2$ for equation 1.7). This allows step 104 to be simplified to compute only two window shapes. Other scaling coefficient calculations can also be chosen while keeping the spirit of the present invention.

In step 110, the data included in the current frame is converted to time-domain data. Typically, this is performed using an inverse Fast Fourier Transformation.

At the step 112, the current frame, now in time-domain form with data embedded, is substituted in place of the corresponding frame in the input signal in which the embedded data is not present. In this way, watermark data may be added to any number of frames within the input signal.

Fault Tolerant Data Embedding

Figure 2:
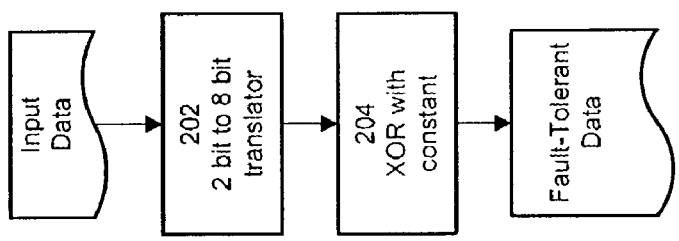
FIG. 2 is a flowchart showing the steps associated with a fault-tolerant data translation method as provided by the present invention.

In some cases, it may be desirable to increase the fault tolerance of embedding method 100. One way of doing this is reformulate the data being embedded so that errors (changes in bit values) become easier to detect and correct. In FIG. 2, a method for reformulating to increase fault-tolerance is shown and designated 200. Other fault tolerant coding mechanisms known in the art can be used. Method 200 begins with step 202 where successive two-bit sequences of data, from a 16 bit piece of data to be embedded, are mapped to eight-bit codes. The skilled reader will recognize that padding bits can be used to embed information that is less than 16 bits in length. The translation between two-bit sequences and eight-bit codes gives the data a degree of fault-tolerance. The eight-bit codes can survive numerous faults (i.e., unwanted changes in bit values) before becoming representative of other eight-bit codes (and two-bit values). To maximize fault-tolerance, a mapping that maximizes binary distance is preferably used. For the case of a two-bit to eight-bit translation, the maximum binary distance is five. The following table lists one possible two-bit to eight-bit mapping having a binary distance of five:

| Two-bit Value | Eight-bit code (Hexadecimal) |
|---|---|
| 00 | 0x1C |
| 01 | 0x65 |
| 10 | 0xAA |
| 11 | 0xD3 |

It should also be appreciated that this two to eight-bit mapping is exemplary.

In step 204, an exclusive OR operation with a constant value is performed on eight combined eight-bit codes (representing one 16 bit piece of data to be embedded) created by step 202. A suitable constant value is 0x0123456789ABCDEF. The exclusive OR with constant operation decreases the regularity of the eight-bit codes. This decreases the perceptibility of the data after it has been added to the input signal. Other fault tolerant encoding schemes are also possible. The resulting fault-tolerant data may be substituted for the data input to embedding method 100.

Signal Compression

In many cases, embedding method 100 will be used with an input signal that has already been compressed by some form of compression algorithm. This is typically the case where embedding method 100 is used to embed data as part of the creation of audio or video content. It is also generally the case where embedding method 100 is used to embed data as part of the distribution or playback of audio or video content. There may be cases, however where method 100 will be used upstream or prior to some form of compression process. In cases where embedding precedes compression, and the compression process is lossy, precautions must be taken to assure that embedded data is not obliterated during the compression process.

To perform embedding before lossy compression, embedding method 100 is modified to place embedded data only within portions of the input signal that will not be obliterated during the compression process. In general, this requires some knowledge of the compression process being used. In particular, it is important to know which portion of the input signal the compression process considers to be psycho-acoustically relevant. This allows embedding method 100 to use a masking process to limit data embedding to the same psycho-acoustically relevant portions. This prevents embedded data from being lost during the compression process.

In some cases, the embedding method is combined with or performed as part of a compression process. This is particularly convenient because the initial steps of method 100 (conversion to frames in step 102 and conversion to the frequency domain in step 104) are also included in popular compression algorithms such as MPEG Layer 3 (MP3) and Advanced Audio Coding (AAC). In combinations of this type, the compression process can be configured to operate either before or after the data has been embedded into the input signal.

For implementations of the first type (compression before embedding), the compression process would typically be configured to follow step 104 and precede steps 106 and 108. For implementations of the second type (embedding before compression), the compression process would typically be configured to follow step 108. Embedding before compression requires (as previously described) that embedding method 100 be configured to limit data embedding to the same psycho-acoustically relevant portions of the input signal.

Data Extraction Method

Figure 3:
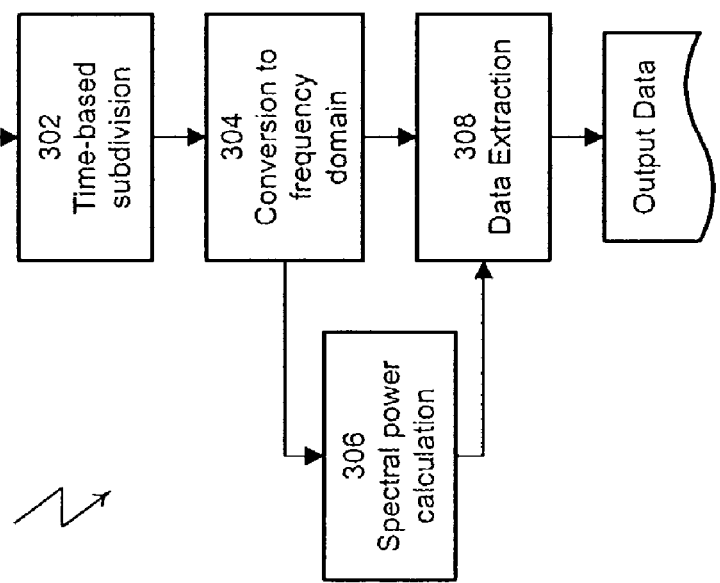
FIG. 3 is a flowchart showing the steps associated with a data extraction method as provided by the present invention.

An aspect of the present invention includes a method for extracting data embedded within audio, video or other multimedia content. An implementation of the embedding method is designated 300 in FIG. 3. As shown in FIG. 3, extraction method 300 accepts an input signal that is assumed to include a quantity of embedded data. The result of extraction method 300 is a quantity of output data.

For this particular example, the input signal is assumed to be in digital, time-domain form. This assumption is made largely to simplify the following description. It should be appreciated, however that extraction method 300 is specifically intended to be useful with signals of other formats (e.g., analog signals) with suitable modification and signal conversion.

In the following description, extraction method 300 is treated as a series of steps. It should be appreciated that this does not necessarily require that the steps be performed sequentially or in the order shown. It should also be appreciated that, at any given time, multiple steps within extraction method 300 may be active in a pipelined, overlapping fashion.

Extraction method 300 begins with steps 302 and 304 where the input signal is divided into a series of signal frames and converted to the frequency domain. These steps are generally analogous to steps 102 and 104 of embedding method 100. For this particular example, the windowing process used in step 304 uses a single Hann window W. This differs slightly from the description of embedding method 100 where three Hann window shapes are used.

Each frequency-domain signal frame produced by step 304 is passed to 306. In step 306, one or more spectral power values P are computed for each received signal frame. For the particular example being described, a single power value $P_1$ is computed for the W window shape. For this example, the power value is defined to be the summation of the magnitudes of the spectral lines within the W window shape. For other implementations, power values may be defined in other ways known in the art.

In step 308, one bit of watermark data (i.e., zero or one) is extracted from the current frame. The extraction process of step 308 is analogous to the embedding process previously described for the watermarking process. In step 308, a value of Diff is computed using equation 1.3 (and the equations subsumed by equation 1.3). The value of Depth is the same constant value of Depth used for embedding. Based on the value of Diff, a one or zero bit is extracted as following:

$$0 \text{ if Diff} \le \frac{\text{Depth}}{2} \quad (1.8)$$

and:

$$1 \text{ if Diff} > \frac{\text{Depth}}{2} \quad (1.9)$$

The binary polarity between bit values and equations 1.8 and 1.9 is chosen to match the polarity of equations 1.1 and 1.2.

The one and zero bits generated during step 308 are the output data from extraction method 300.

Fault Tolerant Data Extraction

Figure 4:
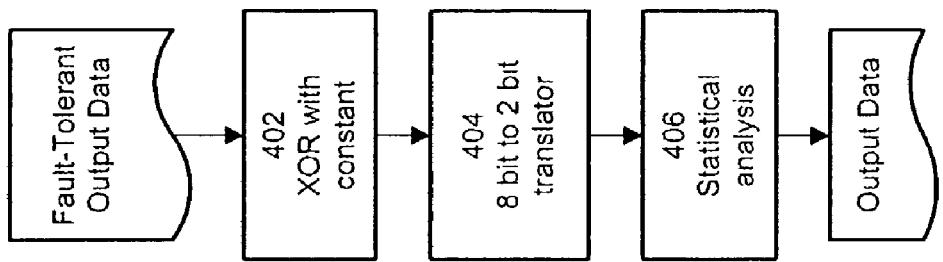
FIG. 4 is a flowchart showing the steps associated with a fault-tolerant data recovery method as provided by the present invention.

As previously described, method 200 may be used to increase the fault-tolerance of embedding method 100. In these cases, the data extracted by extraction method 300 will be in the fault-tolerant redundant form. In FIG. 4, a method for recovering the original data is shown and designated 400.

Method 400 begins with step 402. Step 402 performs an exclusive OR operation on the eight combined eight-bit codes of the data being converted. The second operand to the exclusive OR operation is the constant value used in step 106 (e.g.: 0x0123456789ABCDEF). This effectively returns each eight-bit value to its pre-step 204 (of method 200) state.

Each eight-bit code is then mapped to two bits of data. This mapping is performed using a bit-distance measure to select the closed etalon code for each eight-bit code. If the bit distance is greater than two, the code is assumed to be unrecoverable and a blank code is generated. This effectively returns each eight-bit value to its pre-step 202 (of method 200) state and completes the recovery of that portion of the data being recovered. Eight decoded 2 bit codes combine to form one 16 bit piece of data that was embedded.

Multi-Level Embedding

The descriptions of embedding method 100 and extraction method 300 assume that one bit (i.e., a one or zero) is embedded in each signal frame. This is referred to as bi-level embedding following the practice that is generally applied to electrical and other signals. It should be appreciated that the use of multiple levels (multilevel embedding) may also be used. This allows multiple bits to be embedded in (and extracted from) each signal frame.

Sub-Frame Embedding

Figure 5:
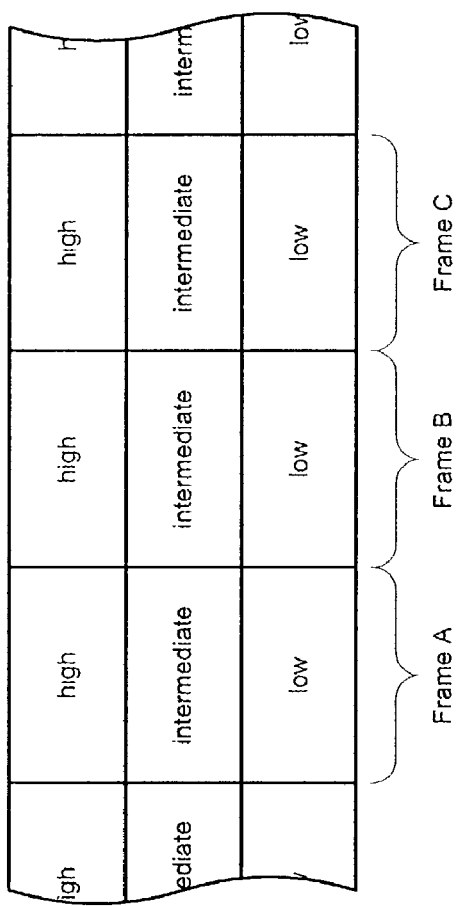
FIG. 5 is a block diagram showing a signal subdivided into signal frames and sub-bands as provided by the present invention.

In the detailed description just described, embedding method 100 and extraction method 300 referred to the use of reference frame differences in spectral power as the element used to embed data. In many cases, it is desirable to extend this concept so that each signal frame is treated as a combination of two or more frequency sub-bands. One way this is done by treating each frame as a combination of high, intermediate, and low frequency sub-bands. Sub-band is used in the following discussion as an exemplary element. In this case, each sub-band (high, intermediate, and low) is an element that can be used as reference elements and/or embeddee elements. Data bits are then defined by referential differences in spectral power between the same sub-bands of two frames from a patterned series of frames. As an example, FIG. 5 shows a sequence of signal frames subdivided into high, intermediate and low sub-bands. Within this sequence, data can be embedded as a spectral power difference between the same sub-band (high, intermediate, or low) of two frames from a patterned series of frames. In the present embodiment, the patterned series of frames are adjacent frames, though other patterns can be employed. Thus, in reference to FIG. 5, in one exemplary embodiment of the invention, 1 bit of information is stored as the spectral power difference between the intermediate sub-bands from frame A and frame B. Another bit is stored as the spectral power difference between the intermediate sub-bands from frame B and frame C. In another exemplary implementation, the specified pattern might be every other frame, such that 1 bit of information is stored as the spectral power difference between the low sub-bands from frame A and frame C. Yet another implementation in the spirit of the present invention a reference element chosen can be a sub-band in one frame, and embeddee elements can be different sub-bands in other frames. In the exemplary implementation just given, the reference element might be the low sub-band from frame A, and the embeddee elements might be the intermediate and high sub-bands of frame C, with the pattern of reference and embeddee elements repeating in subsequent frames. It is also possible, in the spirit of the present invention, that reference and embeddee elements could be chosen to be within the same frame such that bits of embedded information are stored as the difference in spectral power of the embeddee elements in reference to the reference element.

In general, the use of sub-bands is preferred because it tends to reduce perceptible distortion introduced by the embedding process. In addition to reducing perceptible distortion, sub-bands can be used for several different purposes. One of these is to increase the robustness (fault tolerance) of the embedding method. For implementations where this is desirable, the same data is embedded in multiple sub-bands of a signal frame. In the example shown in FIG. 5, this means that the same data may be embedded in each of the three separate sub-bands. This decreases the chances that any portion of the embedded data will be difficult to reconstruct. Another purpose that may be served by the use of sub-bands is to increase bandwidth of the embedding method. For implementations where this is desirable, successive data is embedded in two or more sub-bands of each signal frame. For the example shown in FIG. 5, this means that successive bits might be embedded in each of the three separate sub-bands. Yet another purpose is to embed more than one set of information. In, this case, again in reference to FIG. 5, three sets of embedding information can be embedded, one in each of the three sub-bands. It should be appreciated that tradeoffs between bandwidth and robustness are possible. This would mean that data would be redundantly embedded but not to the extend possible given the number of sub-bands. In the example of FIG. 5, a possible tradeoff would be for each embedding to be performed in two of the three sub-bands.

Further, the use of sub-bands has additional benefits. One benefit is that data can be embedded in the most psycho-acoustic elements of the input signal so that they are better hidden when the signal is compressed using encoders which employ psycho-acoustic models for compression. Another is that the data can be embedded in elements of the input signal that are known to be audible under the largest variety of mechanisms of playback, making the embedded data difficult to remove.

To use multiple sub-bands, respective power values are computed for each sub-band. Where windowing is used, this means that multiple spectral power values are computed for each sub-band. For example, where W, $W^2$ and $W^{3/2}$ window shapes are used, $P_1$, $P_2$ and $P_{3/2}$ spectral power values are computed for each sub-band. In the example of FIG. 5, this yields a total of nine spectral power values for each signal frame (i.e., three values of $P_1$, three values of $P_2$, and three values of $P_{3/2}$).

The computed power values are then used to compute respective values of $S_{coef}$ for each sub-band. This computation is analogous to the computation previously described for the embedding method. The power in each sub-band is then modulated by the computed value $S_{coef}$ for the sub-band to embed the desired data.

Analog Input Signals

In the descriptions of embedding method 100 and extraction method 300 digital input and output signals are assumed. It should be appreciated that analog to digital and digital to analog converters may be used to enable the use of analog input or analog output signals.

Data Demarcation

Figure 6:
FIG. 6 is a block diagram showing a signal including magic number and length fields as provided by the present invention.
Figure 7:
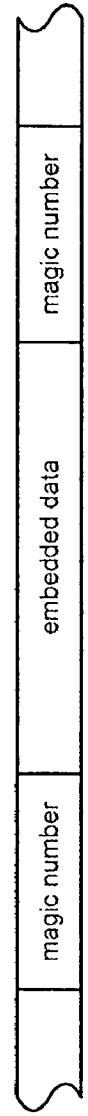
FIG. 7 is a block diagram showing a signal including two magic number fields as provided by the present invention.

Embedding method 100 and extraction method 300 are intended to allow data to be added to and extracted from any portion of a signal. In cases where data is embedded in only a portion of a signal it becomes necessary to use some method to identify the portions where data is embedded. Various methods are appropriate for this type of identification. One is to embed a special value (a magic number) to mark the beginning of any embedded data. As shown in FIG. 6, the magic number can be followed by a second value defining the length of the embedded data. Alternately, as shown in FIG. 7 the embedded data may be followed by a second magic number indicating the end of embedded data. Numerous other identification schemes may also be used.

Extraction method 300 is preferably configured to detect the identification scheme and start and stop extraction accordingly. Extraction method 300 is also preferably configured to detect the bit-wise inverse of any magic number. This allows the polarity of equations 1.1 and 1.2 to be dynamically swapped.

Resynchronization of Frames to Recover Embedded Information

It is necessary to be able to resynchronize the frame alignment so that embedded data can properly be recovered. To do so, a sliding frame process is used, where deeply overlapping frames are offset from each other by some fractional amount of the transform size used to embed the data. The present embodiment of the invention slides the overlapping frames by 1/32 of the frame size used so that detection of bits will not be missed.

Method for Embedding Data at the Time of Signal Use

Figure 8:
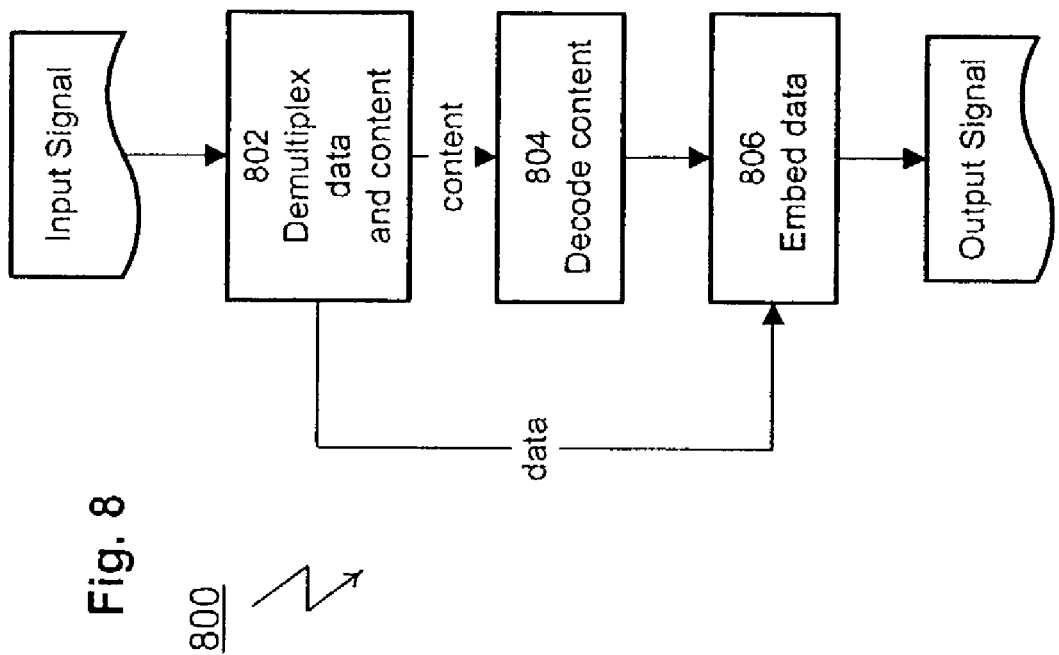
FIG. 8 is a flowchart showing the steps associated with a data embedding method at the time of playback as provided by the present invention.

An aspect of the present invention includes a method for embedding data that is part of an input signal, but not yet embedded in the signal feature. An implementation of this embedding method is designated 800 in FIG. 8. As shown in FIG. 8, embedding method 800 accepts an input signal and creates an output signal. The input signal is a combination of data to be embedded along with audio, video or other multimedia content. Within the input signal, the content and data to be embedded are separate portions. For some embodiments, the data to be embedded is streamed synchronously with the content. For other embodiments, the data to be embedded may precede, follow or be multiplexed within the content portion. The output signal includes the content of the input signal modified to embed the data to be embedded.

The output signal is intended to be usable in place of the original input signal. For this particular example, both the input and output signals are assumed to be in digital, time-domain form. This assumption is made largely to simplify the following description. It should be appreciated, however that re-embedding method 800 is specifically intended to be useful with signals of other formats (e.g., analog signals) with suitable modification and signal conversion.

In the following description, re-embedding method 800 is treated as a series of steps. It should be appreciated that this does not necessarily require that the steps be performed sequentially or in the order shown. It should also be appreciated that, at any given time, multiple steps within re-embedding method 800 may be active in a pipelined, overlapping fashion.

Embedding method 800 begins with steps 802 where the input signal is de-multiplexed into its data and content portions. The decoded content and the data portion are passed to step 806. In step 806, the data portion is embedded into the content portion during reproduction of the signal, such as occurs when an audio signal is being rendered audible.

CONCLUSION

Although particular embodiments of the present invention have been shown and described, it will be apparent to those skilled in the art that changes and modifications may be made without departing from the present invention in its broader aspects, and therefore, the appended claims are to encompass within their scope all such changes and modifications that fall within the true scope of the present invention.

What is claimed is:

1. A method of embedding data into a signal, comprising: making changes to elements of the signal according to the data in a manner that resulting embeddee elements have predefined relationships to other elements of the signal that are used as reference;
further comprising mapping the embedding data to fault tolerant codes.

2. A method of embedding data into a signal, comprising: making changes to elements of the signal according to the data in a manner that resulting embeddee elements have predefined relationships to other elements of the signal that are used as reference;
wherein making changes to the elements of the signal includes modulating the power of the signal elements.

3. A method of embedding data into a signal, comprising:
Subdividing the signal into a number of frames, the frames individually including a specified amount of data,
Determining one or more values of elements of the frames, and
Changing one or more values for embeddee elements of a current frame in a predefined manner with respect to values of reference elements in one or more other frames so as to store the data in differential relationships with the reference elements;
And further comprising mapping the embedding data to fault tolerant codes.

4. A method of embedding data into a signal, comprising:
Subdividing the signal into a number of frames, the frames individually including a specified amount of data,
Determining one of ore values of elements of the frames;
Changing one or more values for embeddee elements of a current frame in a predefined manner with respect to values of reference elements in one or more other frames so as to store the data in differential relationships with the reference elements; and
Wherein changing the values of elements includes modulating signal power within said elements.

5. A method of embedding data into an input signal, comprising scaling embeddee elements of the input signal by an amount that is a function of a difference in value of the embeddee lement to one or more reference elements and the value of the data to be embedded;
further comprising mapping the embedding data to fault tolerant codes.

6. A method of embedding data into an input signal, comprising scaling embeddee elements of the input signal by an amount that is a function of a difference in value of the embeddee lement to one or more reference elements and the value of the data to be embedded;
wherein the change includes the modulation of signal power.

7. A method of embedding hidden data into a signal, comprising, at the time of signal use, multiplexing the data to be embedded with the signal and embedding the multiplexed data into the signal during reproduction of the signal.

8. A method of embedding hidden data into a signal, comprising, at the time of signal use, multiplexing the data to be embedded with the signal and embedding the multiplexed data into the signal during reproduction of the signal by making referential changes to elements of the input signal so that the changed elements have predefined relationships to other elements of the input signal used as reference.

9. A method of encoding data bits in a signal, the method comprising:
identifying a current frame and another frame within the signal; and
modulating at least one portion of the current frame with respect to at least one portion of said another frame to encode one or more data bits in the signal.

10. The method of claim 9, wherein modulating the portions of the current and said another frames includes modulating the power of at least one portion of the current frame with respect to the power of at least one portion of said another frame.

11. The method of claim 9, further comprising converting the current frame and said another frame into the frequency domain.

12. The method of claim 11, further comprising identifying more than one frequency sub-band range in both the current frame and said another frame, and wherein modulating the current and said another frames includes modulating at least one sub-band of the current frame with respect to at least one sub-band of said another frame.

13. The method of claim 12, wherein modulating at least one sub-band of the current frame with respect to at least one sub-band of said another frame includes modulating the power of said at least one sub-band of the current frame with respect to the power of said at least one sub-band of said another frame.

14. The method of claim 9, wherein said another frame includes a frame occurring prior to the current frame.

15. The method of claim 9, further comprising mapping the data bits to fault-tolerant codes.

\* \* \* \* \*